United States Patent [19]
Broding et al.

[11] 3,909,776

[45] Sept. 30, 1975

[54] FLUIDIC OSCILLATOR SEISMIC SOURCE

[75] Inventors: Robert A. Broding; Ralph A. Landrum, Jr., both of Tulsa, Okla.

[73] Assignee: Amoco Production Company, Tulsa, Okla.

[22] Filed: Oct. 1, 1973

[21] Appl. No.: 402,441

[52] U.S. Cl. .............. 340/17; 340/18 NC; 340/9; 181/106; 181/119; 116/137
[51] Int. Cl.² ............................................. G01V 1/14
[58] Field of Search .......... 340/18 NC, 17, 15.5 BH, 340/9; 181/.5 H, .5 AG; 166/177; 116/DIG. 7, 137 R; 137/81.5

[56] References Cited
UNITED STATES PATENTS

| | | | |
|---|---|---|---|
| 3,520,362 | 7/1970 | Galle | 166/177 |
| 3,730,269 | 11/1973 | Galle | 166/177 |
| 3,770,006 | 11/1973 | Sexton et al. | 340/18 NC |
| 3,792,429 | 2/1974 | Patton et al. | 340/18 NC |
| 3,860,902 | 1/1975 | Galle | 340/18 LD |

Primary Examiner—Maynard R. Wilbur
Assistant Examiner—N. Moskowitz
Attorney, Agent, or Firm—Paul F. Hawley

[57] ABSTRACT

A fluidic oscillator suitable for use as a seismic source in a well is disclosed. The frequency of this source is variable over a predetermined range. The frequency can be changed stepwise, or in a smooth continuous fashion, and the whole change can be repeated in any desired pattern. Methods of use of such a source in seismic prospecting are also described, particularly in the investigation of subsurface structural variations over a vertical rather than a horizontal zone.

8 Claims, 6 Drawing Figures

FLUIDIC OSCILLATOR SEISMIC SOURCE

BACKGROUND OF THE INVENTION

1. Field of the Invention

Acoustical ranging to determine discontinuities in strata has been widely practiced for many years in the field of seismic prospecting. Seismic waves reflected from interfaces between rocks having different acoustical resistance can be detected even in the presence of considerable noise, and the depth and dip of such discontinuities determined. From the general nature of the source and geophone relationship in ordinary seismic prospecting, it follows that usually the discontinuities which can be determined are those which have a relatively low dip, preferably below, say, 45°. It has been extremely difficult and frequently impossible to detect by these methods more or less vertical interfaces, such as fault planes, flanks of salt domes, and the like. A few attempts have been made to investigate these approximately vertical discontinuities by use of a well which is drilled in the vicinity of the interface and apply normal prospecting methods in the well. This entails using a seismic source and a set of geophones in the well.

Explosive sources do not appear to be adapted to such surveying in a well, both from the fact that the shot tends to destroy the well and also due to the fact that if the shot is placed below the spread, it is necessary to haul the spread out after each shot and replace it before the next, whereas if the explosive were located above the spread, the explosion would probably wreck the geophone cable.

It is desirable, therefore, to use a different kind of source with such a vertical spread in a well. The difficulty has been that other types of seismic sources generally speaking have not had sufficient energy to make such "vertical geophysical prospecting" commercially successful. Constant frequency seismic sources or oscillators of sufficient energy are known, but these pose their own problems in the methodology of recording and producing from the records an indication of the more or less vertical discontinuities. On the other hand, variable frequency seismic sources of effective power which could be used with an approximately vertical spread in a well in accordance with the so-called Vibroseis system have been unknown. (See, for example, the Doty et al., U.S. Pat. No. 2,688,124, for a general description of the Vibroseis method.) It is an object of this invention to disclose powerful variable frequency fluidic oscillators suitable for use as the seismic source in a well, which permits the use of the vertical spread concept on a practical basis. Special methods involved in the use of such sources are also disclosed.

2. Description of the Prior Art

One of the earliest patents concerning vibratory wave generation in a well was the Cloud patent, U.S. Pat. No. 2,281,751. This seismic source employed a liquid in a confined zone near the bottom of the well to which pulsating pressure was applied from a fluid line communicating with a pulsating pressure source at the surface. No vertical spread was contemplated with this source for the obvious reason that the sensitive geophones would be adjacent the pipe carrying the pulsating pressure to the zone at the bottom of the well. This would have produced intolerable amounts of noise on the records.

Even earlier, McCollum had disclosed in two U.S. patents (Nos. 2,021,943 and 1,909,205) sufficient information to inform seismologists that geophysical prospecting could be carried out from sources in wells. Also in this same early period is the U.S. Patent to Guanella, No. 2,253,975, which, without reference to sources or indeed to well systems showed that one could employ a variable frequency signal for distance determination. The Doty et al. U.S. Pat. No. 2,688,124, has already been mentioned as teaching an arrangement in which a surface source using a variable frequency seismic generator was employed to determine subsurface interfaces. In this same period, there are several patents to Bodine (see, for example, U.S. Pat. No. 2,745,507), which teach an alternating seismic source in which the inertial reaction of rotating unbalanced weights is used to create the seismic wave train.

The Menshall, et al., U.S. Pat. No. 3,034,594, shows a number of seismic sources which can be used to impart a steady-state or frequency-variable seismic oscillation to the ground. One of these types, a hydraulic ram, is taught to be suitable for use in a well. Another generator (not shown) involves applying the desired alternating pressure to a hole filled with liquid. In general, this whole patent is directed at arrangements by which constant-frequency signals can be generated and transmitted.

Miller in U.S. Pat. No. 3,282,371 discloses apparatus suitable for use in a well for generating seismic waves. This comprises setting an anchor either at the surface or at an upper region in a well and a second anchor at a point below the first, and applying varying forces between the sets of anchors. This produces variations in the compressional force exerted between the two sets of anchors and thus generates vertically polarized seismic waves. This is expanded on in the companion patent to Miller, et al., U.S. Pat. No. 3,346,066. Obviously, in both of these inventions, a major requirement is that the equipment is anchored at different elevations in the well.

A different group of patents has treated an associated subject, that of applying very high-power acoustic waves to a well in an oil field in order to treat the producing formation. Thus, we find the Bodine patent, U.S. Pat. No. 2,871,943, teaching applying a constant-frequency oscillation at the upper end of a string of pipe, or the like, the lowermost end of which is opposite the producing part of the formation. This lower part is coupled acoustically to the formation by the liquid in the well. Alternating force is produced by rotating a plurality of geared counter-rotating eccentrically mounted weights. Sufficient acoustic energy was to be generated to stress the producing formation until it ultimately fractured by fatigue failure. The apparatus was, of course, of such dimensions that it could go into the well. One major difficulty with it lay in the fact that there was a very long string of pipe, or the like, between the oscillator and the point of application. A related but not pertinent patent to Bodine is U.S. Pat. No. 3,189,092, which adds the feature of cavitation in order to produce an asymmetrical, i.e., non-sinusoidal, pressure fluctuation at the formation to be treated. The Books patent, U.S. Pat. No. 3,315,755, taught the application of a cyclically repetitive wave of one basic frequency (which was constant) to the walls of the producing formation in order to drill a well. This involved a piston which was reciprocated against the formation.

At the same time, drill fluid was circulated through the well to remove any cuttings.

The Brandon patent, U.S. Pat. No. 3,422,894, applies acoustic energy to a producing formation over certain periods of time. In between these periods, the fluid medium and sonic waves are withdrawn. In connection with this an alternator or turbine type of oscillator was disclosed which applied preferably a cyclically repetitive set of pressure pulses to the formation.

Three associated patents are of more pertinence than those discussed above. These are the patents to E. M. Galle, et al., U.S. Pat. Nos. 3,405,770, 3,520,362, and 3,730,269. In the first of these, the inventors teach a drilling system incorporating a fluidic oscillator. This is an oscillator which converts part of the energy in a stream of flowing liquid into kinetic energy at the bottom of the well and oscillates a bit against the formation. The word "fluidic" is intended to convey the fact that there are no moving mechanical parts in the structure. The drilling device was intended to operate essentially at a single frequency. Part of the drilling fluid exhausts opposite the drilling bit and this discharge has a pressure variation of the same frequency as that applied to the bit itself. Accordingly, there is acoustic energy applied in two fashions to the surrounding formation.

U.S. Pat. No. 3,520,362 employs a somewhat similar idea in that a constant-frequency fluidic-type oscillator with associated fluidic coupling means applies a sinusoidal pressure fluctuation to the fluid in a well. In this case, the purpose of the device is to treat acoustically a selected isolated zone to large pressure fluctuations, for efficiently stimulating the production of fluids from the formation. Above and below the treated zone, the apparatus has acoustic filters which tend to minimize the amount of acoustic energy transmitted to fluid above or below the device. A continuation of this is found in Galle's U.S. Pat. No. 3,730,269. The devices taught in these two patents generate sufficient acoustic energy so that it is possible through their use to not only apply violent agitation to the formation, but, at least in some instances, to fracture it.

While none of these last three patents specifically has taught the use of such a device for seismic prospecting, it is apparent that the degree of power available in such devices is sufficient so that it can be employed for that purpose in the type of "vertical" seismic prospecting discussed above. The difficulty lies in the fact, however, that in such applications it is frequently not desirable to employ the single frequency inherent in the design of the apparatus disclosed in these three patents.

Fluid-type oscillators and amplifiers are discussed in the text "Fluid Amplifiers," by Joseph M. Kirshner, McGraw-Hill Book Company, 1966. Mr. Kirshner is also the author of a helpful pamphlet entitled "Fluerics 1. Basic Principles," numbered TR-1418 of the U.S. Army Materiel Command, Washington, D.C., November 1968.

SUMMARY OF THE INVENTION

A fluid oscillator is provided which can serve in a well as a powerful source for seismic waves. The oscillator includes means within the device for changing the generated frequency as time increases. The source is fed a fluid under pressure and as a result provides a pulsating pressure against the well walls in a frequency vs. time pattern that can be repeated. Such a source is immediately adaptable to methods of vertical seismic prospecting, some of which are described.

DESCRIPTION OF THE PREFERRED EMBODIMENTS

Figure 1:
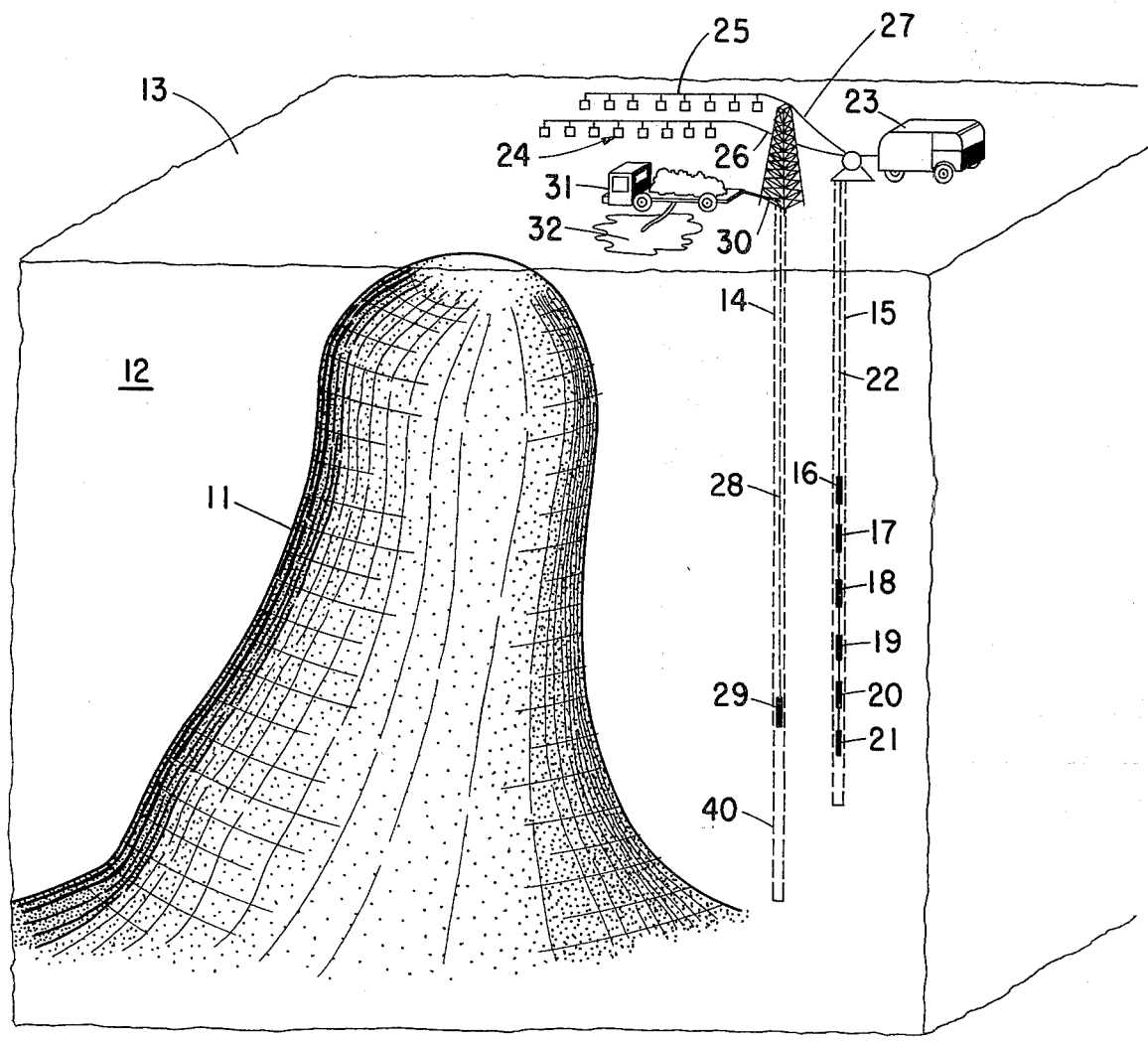
FIG. 1 is a diagrammatic view of equipment useful in carrying out this invention shown located in wells near a salt dome, or the like, together with surface equipment useful in carrying out this invention.

FIG. 1 illustrates generally the application of the invention to the determination of the location of a salt dome generally indicated by reference numeral 11. This salt dome is in the earth 12 below the surface 13. In this drawing, two wells, 14 and 14, are shown having been drilled adjacent the salt dome. (Some times only one well is necessary for the type of survey now being considered.) A string of pipe 28 has been lowered into well 14. At the lower end of this is located the oscillator, generally indicated by number 29. At the top, this pipe is suspended in a derrick 30. The pipe is connected to a pump truck 31, which, in turn, is supplied with fluid, for example, by pit 32. Incidentally, it is highly desirable that well 15 be not cased, that is, have no strings of pipe opposite the zone in which the well seismometers 16–21 are located. It is also desirable that the oscillator 29 be located either opposite a string of perforations in casing, or in an uncased section of well 14. It is also assumed that wells 14 and 15 have been surveyed, so that the location of oscillator 29 and of the well geophones 16–21 can be located with the desired precision in three dimensions.

In the other of these wells (well 15), a plurality of well geophones or seismometers 16–21 have been lowered on a multi-conductor cable 22 from an instrument truck 23, to which the cable is connected and which contains the usual amplification, mixing and reproducible recording facilities employed in seismic prospecting. Also shown in FIG. 1 are two additional surface spreads of seismometers or geophones generally indicated at 24 and 25. These are likewise connected by multi-conductor cables 26 and 27 to the recording truck 23. Such arrangements of seismometers or geophones are very well known in the seismic exploration art. It is sufficient to state here that each seismometer or group of seismometers is connected by a separate insulated line in a cable to the truck recording apparatus. Since this invention is not particularly concerned with the recording aspects of this system, little need be said about such equipment which may be conventional.

When the equipment has been located as shown, the pumps on truck 31 are employed to send liquid through the oscillator 29. Discharge from this oscillator returns through the annulus to the surface. As is described in more detail in connection with the other drawings, this oscillator is a powerful variable frequency fluid oscillator, and it sends out a varying frequency group of seismic waves in a burst or pattern. The response of the vertical spread of geophones 16–21 and of horizontal spread on or near the surface, such as spreads 24 and 25, are recorded as in customary seismic prospecting, in the recording truck 23. This gives seismic data on the dome for both reflections and refractions.

The output from one such burst of energy may not be as much as is desired to achieve a certain signal-to-noise ratio. In case it is, this concludes the survey with the oscillator 29 and the horizontal spreads 24 and 25 and vertical spread of seismometers 16–21 at their initial locations. Thereafter, the spreads of seismometers and the oscillator can be moved to other locations so that other survey points on the top and flanks of the salt dome 11 may be located.

As mentioned above, the energy output of the oscillator 29, even while considerably larger than that of most oscillators that have been proposed for well use, still may be insufficient to give a desired signal-to-noise ratio. In this case, after the initial burst of multi-frequency energy has occurred, the pumps on truck 31 may be turned off during a recording period. After that, a second signal, which will be very much like the first signal from the oscillator 29, will be initiated by again actuating the pump truck 31. In some embodiments of this invention, the oscillator 29 is arranged to be actuated automatically to put out a multi-frequency signal over a pre-determined frequency range simply by pumping fluid at a preferred and predetermined pressure and volume through the oscillator. In other embodiments as will be subsequently shown, this is accomplished by starting up an electric motor or the like inside of the oscillator 29. In either case, a repetition of signals can be put out at intervals of the order of 6 to perhaps 12 or 15 seconds, and the signals received at the well spread of geophones 16–21 may be added as is well known. One can also use common depth point methods of seismic prospecting, shown, for example, in the Mayne patent, U.S. Pat. No. 2,732,906.

It is desirable that the oscillator 29 be able to repeat the multi-frequency signal pattern automatically. With this arrangement, it is possible to eliminate the necessity of determining the pattern of pulsations of a changing time pattern put out by the oscillator. As long as the multi-frequency signal follows the same pattern each time, this pattern can be ascertained by test (for example, in a shallow well). This pattern can then be cross-correlated with the received signals at each geophone. Each such correlated record contains an abrupt time signal at the arrival time of the direct wave and one or more at the arrival times of reflected waves. From three geophones traces and one source location, one unmistakable determination of a reflection point can be computed by well known equations of seismic prospecting, and not unique to this invention. This, in FIG. 1, will be a point on the flank of dome 11. When multi-frequency signals are employed in surface prospecting, for example, the Vibroseis system — the frequency-amplitude pattern desired of the ground shakers is fed to the shakers. The recorded trace of this pattern is correlated with the pattern to determine the actuation time. However, when the oscillator is at the desired position in a well, as in the case of oscillator 29 in FIG. 1, it is no longer easy to actuate this oscillator in that fashion, and the method discussed above is preferably employed.

With the arrangement shown in FIG. 1, when the seismic waves from oscillator 29 encounter interfaces (such as that between the salt dome and the adjacent rock strata), reflections are produced which affect the responses of the vertical geophone spread 16–21, essentially in the same manner that a horizontal set of oscillator and geophones would be affected by a horizontal interface. Accordingly, it is possible from these records to determine the more or less vertical discontinuities.

It was earlier mentioned that one or two additional spreads were preferentially laid out along the surfaces, for example, as shown at 24 and 25 in FIG. 1. This gives still additional geophone coverage and permits the possibility of finding other refraction data, and perhaps even other reflection points from other surfaces due to the seismic signals put out by oscillator 29 and received at the spreads 24 and 25. By judicious combination of this sort of spread arrangement, it is possible to employ a minimal number of wells in this vertical prospecting, which is of course desirable since the drilling of these wells constitutes one of the major expenses in this type of prospecting.

It is also possible to put a second well on the opposite side of the dome (or the like) from the oscillator. In this case, the spread of geophones in this second well produces records from which refraction calculations outline the flanks of the dome.

It is seen that the vertical spread of geophones in well 15 could be put into well 14. In this case, it is desirable to have oscillator 29 above the spread (i.e., above geophone 16) to minimize seismic pickup from the pipe 28.

It should be added that the variable frequency oscillator need not be of changing pulsation pattern. In this case, it is simply necessary to put a well geophone on the oscillator 29 or couple it to the pipe supplying fluid under pressure to this oscillator, and record the output of this geophone on a recorder trace in the truck as a contemporaneous record of the oscillator output. This trace then is used for the cross correlation of the vertical or horizontal spread geophone traces in the usual fashion.

Figure 2:
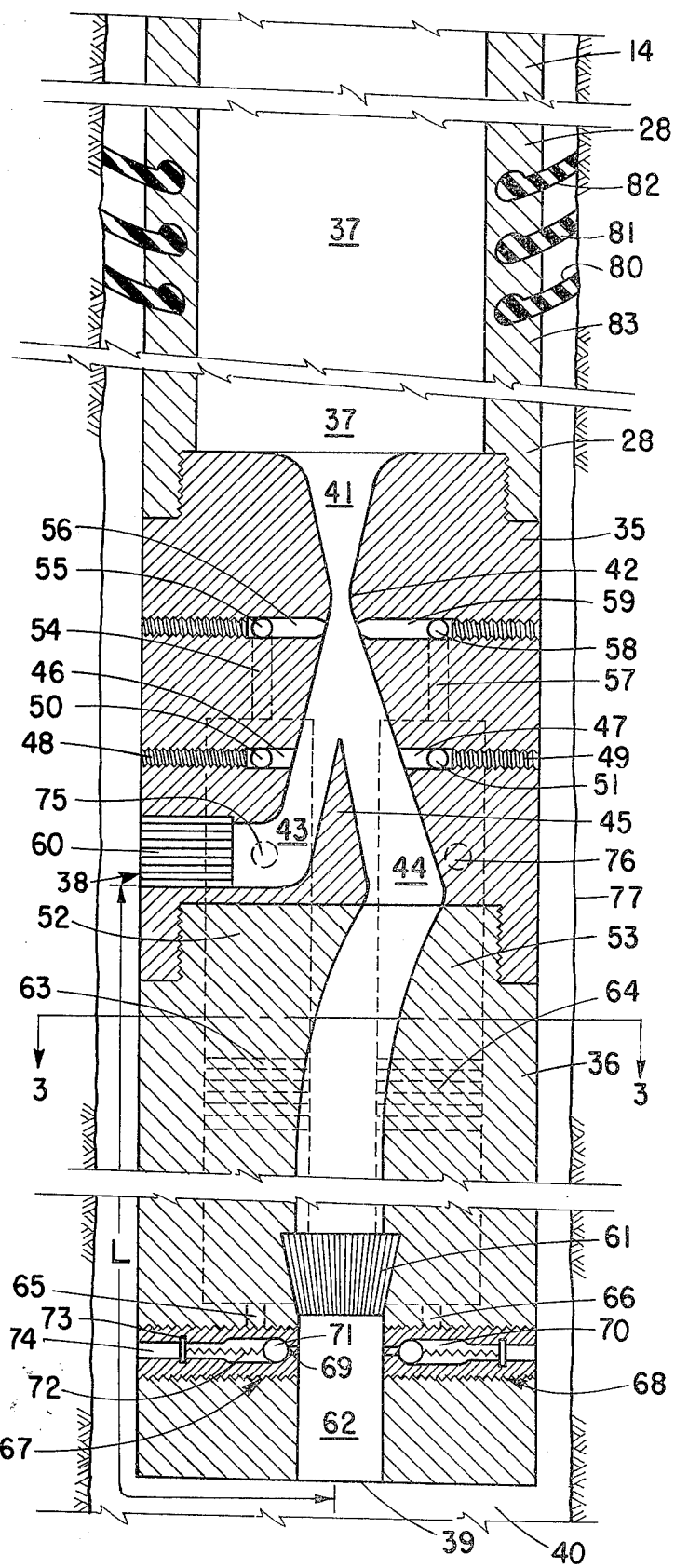
FIG. 2 shows a cross sectional view across a variable frequency fluidic oscillator for use as a seismic source in accordance with my invention.
Figure 3:
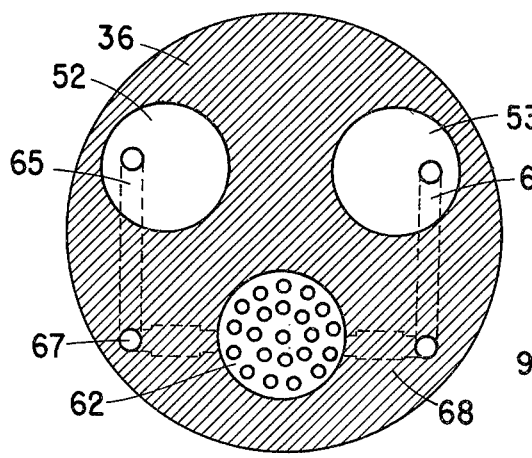
FIG. 3 represents a cross section across the equipment shown in FIG. 2, along the plane 3—3.

One of the preferred forms that oscillator 29 can take is shown in diagrammatic cross sectional view in FIG. 2 and a section is shown in FIG. 3. In this figure, pipe 14 is screwed into isolator sub 28 which in turn is screwed into upper body member 35, affixed to the lower body member 36.

Upper body member 35 has been especially machined to provide the necessary passages of the proper shape to constitute a fluid fluid actuated oscillator, in conjunction with lower body member 36. More specifically, the arrangement shown in FIG. 2 converts the relatively smoothly flowing liquid stream in the opening 37 inside pipe 28 into a pulsating stream discharged through the two ports 38 and 39 into the cavity 40 of the well. The pulsations are at a variable, repetitive rate or pattern.

The upper part of body member 35 is a converging conduit 41 with a throat 42 at its narrowest point. Below this, the passage widens into two channels 43 and 44. (This is called a bistable or two-channel oscillator.) The passages 43 and 44 constitute a fork below the throat 42. A splitter 45 separates the two passages 43 and 44. Adjacent a lower part of passage 43 is a side passage 46, and adjacent passage 44 is a similar side passage 47. These passages do not extend completely to the outer surface of upper body member 35, being closed by threaded plugs 48 and 49. They are connected by transverse passages 50 and 51, respectively, with two large cavities 52 and 53 which are vertically oriented and which lie behind the plane of passages 43 and 44. At the top of cavity 52, it is connected by a vertical conduit 54 and a horizontal conduit 55 with the horizontal passageway 56, which terminates at a point vertically above passage 46, in the left-hand wall of the fork of the two passages below and near the throat 42. Cavity 53 is connected through conduits 57 and 58 to passageway 59, which terminates in the right-hand wall of passage 44 immediately above the exit of passage 47 and below throat 42.

As is shown in FIG. 2, an attempt is made to make the left- and right-hand portions of body 35 so far described on a mirror-symmetric basis.

This is not true at the lower end of channel 43, which may be vented to port 38 through an acoustic resistance 60 in the side of the body member 35. This acoustic resistance, incidentally, is simply an arrangement, such as a permeable plug or bundle of small diameter tubes, in which the resistance to flow through a unit length of the device is much greater than through an unimpeded channel of the same dimensions.

This acoustic resistance serves to minimize effects of borehole changes in dimensions, by somewhat decoupling the acoustic impedance between ports 38 and 62 from the oscillator. Since it does reduce available power, a minimum resistance is desired. If it is known that the well is near true gage size, it may be desirable to omit the resistances 60 and 61 so full oscillatory pressure can be applied to the borehole.

The lower body member 36 has been so machined that cavities 52 and 53, the upper part of which exist in upper body member 35, extend right into the lower body member so that, in fact, each of these is a continuous cavity down to its bottom.

Channel 44 is prolonged axially into body member 36, as shown in FIG. 2, and preferentially but not necessarily is brought back essentially to the central part of this body member, where it, in turn, passes into an acoustic resistance 61, which can be identical or at least similar to acoustic resistance 60. The passageway, now shown as number 62, continues to port 39.

In the lower part of each cavity 52 and 53, there is a free piston (63 and 64, respectively) suitably provided with seals, piston rings, or the like, so that there will be little liquid leakage along the outside of these pistons, while they do provide an acoustic barrier across the cavities 52 and 53. These free pistons, as the name indicates, can slide up and down in the cavities 52 and 53, which are of uniform bore throughout.

At the lower end of these two cavities 52 and 53, there are passages, respectively labeled 65 and 66, by which the cavity communicates with a check valve assembly identified as numbers 67 and 68, generally. Since these check valve assemblies are identical, only the left one will be described. There is a small passage 69 communicating with the large passageway 62. Behind that is a relatively large bore 70 accommodating a check valve or ball 71 biased by spring 72 held by a pin 73. The bore narrows so that the ball check 71 may fit and seal against passageway 69 on the right, or against the end of bore 74 on the left, thus sealing off this passageway. Accordingly, if the fluid force through passage 69 against ball 71 is greater than that exerted through passage 70, plus the spring force due to spring 72, ball 71 will move to the left and seal passage 74. When this passage is sealed, the lower end of cavity 52 is in fluid communication with passageway 62, whereas, when ball 71 is as shown in FIG. 2, it is in fluid communication through the side with the well cavity 40.

The operation of a fluidic oscillator has already been described by Kirshner, in both references given. It has also been described in each of the three patents in which Mr. Galle is an inventor, as mentioned above. It is only necessary here to point out that the time at which the feedback from passage 46 to passage 56 becomes effective is governed by the combination of the fluid inertance of conduits 46, 50, 54, 55 and 56, and the fluid compliance of cavity 52 above the free piston 63. It is understood that any container or passageway has acoustic inertance, compliance, and resistance, just as any electric conductor has inductance, capacitance and resistance. However, one primarily characterizes a container or passageway in terms of the major effect opposing flow of acoustic waves. Thus, conduits or channels long in relation to their cross sectional area are considered to be acoustic inertances if fluid movement or flow is essentially streamlined. Acoustic compliance is the term used for volumes in which there is little flow but considerable storage. If there is considerabe eddying in a passage, it is considered an acoustic resistance. (For a comparison of electrical and acoustic analogies and definition of acoustic reactances, see *Elements of Acoustical Engineering*, Harry F. Olson, D. van Nostrand Co., Inc., New York, 1940, pp. 49–75.) In this specification and claims, these terms are used with the meaning just outlined.

A satisfactory simplified formula for acoustical inertance in liquid-actuated systems is given by $$L = \frac{\rho l}{A} \quad (1)$$

where
$\rho$ = mass density, for example, in slugs/feet$^3$,
$l$ = length of passageway, e.g., feet,
$A$ = cross sectional area of the passageway, for example, in square feet.

On a similar simplified basis, the formula for the acoustical capacitance (also called "compliance") is given by the formula $$C = \frac{V}{\rho c^2} \quad (2)$$

where
$V$ = volume of the cavity, for example, in cubic feet,
$\rho$ = mass density; see above, and
$c$ = speed of sound in the liquid, for example in feet per second.

The formula for acoustical resistance on the same basis is $$R = \frac{Kl\mu}{A} \quad (3)$$

where $K$ = a constant,
$\mu$ = viscosity in centipoises of the liquid,
and the other values have been given above.

The design formula which is used simply states that the series combination of the acoustic inductance of the passages from the entry port of passage 46 to the output of passage 56, and the acoustic compliance or capacity of the cavity 52 should be in resonance. That is, at a particular resonant frequency f, there should exist the following equation.

$$f = \frac{1}{2\pi \sqrt{LC}} \quad (4)$$

This again is a simplification.

It is to be noted that, in this arrangement, the capacity is a term dependent upon the volume in cavity 52 above the free piston 63. Accordingly, since this is a variable due to motion of the piston, it is apparent that the frequency of the oscillator is likewise variable.

In operation, with no flow of liquid through 37, the check valve or ball 71 connects the lower portion of cavities 52 and 53 (that below the free pistons 63 and 64) with the well 40. Accordingly, the two free pistons 63 and 64 will, in the absence of fluid flow, gradually settle to a lowermost position, essentially at the bottom of cavities 52 and 53. One simple means of operating this oscillator is to start up the pumps at this time and pump at essentially constant rate through the pipe 14 into the oscillator. As soon as the force on the ball 71 is sufficient to cause it to shift to the left, the initial pressure impulse in passageway 62 will cause an increase of pressure at the bottom of cavity 52, and accordingly there will be a pressure differential across each free piston 63 and 64, tending to make them rise in the cavity. The rate of rise, of course, is dependent basically upon the pressure differential across the piston and under the same pressure differential (and this is the important point), the piston will rise at essentially the same rate each time this pressure condition is established. The same condition, of course, is applicable in cavity 53. Accordingly, the fluid actuated oscillator commences to oscillate at its lowest frequency, but as fluid continues to be pumped through passage 37, preferably at constant pressure, this frequency will increase as C decreases, that is, as pistons 63 and 64 rise in the cavity up to their top positions which is governed by the position of a stop of some mechanical sort, such as stops 75 and 76, which can be simply pegs in the wall of the cavity.

A simple calibration of the device under various rates of flow will establish how long it takes under any given pressure drop across the oscillator for the pistons 63 and 64 to travel from the lower to the top end of their positions. In operation, therefore, it is simply necessary to establish the desired pressure differential, and maintain it for this period of time. Referring back to FIG. 1 it can be seen that if this pump procedure is followed, each time this pressuring operation takes place, the oscillator 29 will send out a pattern of signals, the frequency of which will change from a predetermined minimum to a predetermined maximum value in essentially an identical time pattern to that of any previous signals cycle, and, therefore the geophone outputs can be cross-correlated and compounded as discussed above.

Other forms of valving can be used to permit the inertial pistons 63 and 64 to move in the cylinders or cavities 52 and 53. For example, a small diameter hole (not shown) could be used as a leak between a cavity such as 52 and the passage 62. This would eliminate the need for check valves. The time for each piston (63 and 64) to traverse the length of its associated cavity is determined mainly by rate of flow through this leak. Of course this method has a disadvantage in requiring a longer time to allow each piston to sink to the bottom or starting point in the cavity before a new sweep.

It is to be noted that the discharges from ports 38 and 39 occur alternately. That is to say, the column of liquid which passes the throat 42 is caused to move alternately between channels 43 and 44, and since the arrangement up to this point is essentially symmetric, each channel will be occupied roughly half the time. Of course, there is a time lag between the time that the column of liquid through channel 43 is forced out port 38, and that in channel 44 is forced out port 39 due to the extra length of that latter channel. Advantage is made of this by choosing the length L between the two ports to be about ¼ wave length at the average frequency of the variable-frequency oscillator. With this arrangement, the pulsating fluid forced out the two ports 38 and 39 is employed most effectively as a seismic source in pressuring up the walls 77 of the well 14 at this point.

It is desirable to confine the pulsating source of seismic sound to the region near the oscillator 29. In order to do this, it is advantageous to employ means above the oscillator 29 to attenuate the pulsating components of the energy associated with the flow of fluid up through the annulus between the pipe 28 and the walls of the well. In FIG. 2 is shown, for example, a plurality of slightly cup-shaped rubber inserts 80, 81 and 82, which are preferably molded into a section 83 of the pipe 14. The molded shape of these somewhat flexible members is such that this will pass the steady-state component of the fluid flowing upward in the annulus while considerably muffling the pulsating component of this fluid, which is, of course, the source of the seismic waves radiating outward from the well wall. The Galle patents, mentioned above, teach the use of Helmholtz resonators above and below the oscillator as a means of rapidly attenuating the alternating component of pressure flow, and it is true that such may be employed in the arrangement shown in FIG. 2. The only disadvantage of this is that by their very nature, the Helmholtz resonaters are tuned to a specific frequency and are not very effective attenuators of sound at frequencies outside that for which they are designed. No lower acoustic attenuator of any shape has been shown in FIG. 2 but, if desired, one can be provided at a more or less arbitrary distance below the opening of the port 39, which, in this case, would be a side-opening port rather than one opening downward.

The free pistons 63 and 64 should have reasonable inertia. To accomplish this, it is found desirable to have the length of these in the axial direction several diameters of the piston.

Since FIG. 2 is not drawn to scale, it is of assistance to give some design details. For example, if the passages from 46 to 56 are of the order of 1/10 inch diameter and a total length of approximately 1 foot, it is found, the tool 29 oscillates at 16 Hz. when the cavity 52 is of 1-inch diameter and 15 feet long. Under the same conditions, at a total cavity length of 5 feet, the frequency has risen to 50 Hz. The range of frequencies involved is, of course, a very practical one, being one that has been frequently applied in vibratory prospecting in the field.

No comment has been made about the power capabilities of such an oscillator. It is easily possible to obtain pressure variations of the order of 250 psi peak-to-peak to 1,000 psi peak-to-peak. It is desirable to keep the pressure peak below the point at which the formation will fracture. Even at the minimum pressure variation cited, it is easily possible to obtain in the well more than enough seismic energy to actuate the geophones available for well use at the present time. In fact, this has been experimentally determined in actual tests.

One point which has not been mentioned is that the acoustic resistances 60 and 61 play an important part in this oscillator. It is desirable to have the frequency of the source determined chiefly by the design parameters of the tool itself rather than by the cavity in which it is located. The acoustic resistances tend to isolate the oscillator from the effect of the cavity 40. There is more than sufficient acoustic power available so that it is not necessary to be particularly concerned about the fact that some acoustic energy is lost in the acoustic resistances. For this reason, it is preferable to have the narrow tubes forming the acoustic resistances 60 and 61 be as long as possible. This is not an important design criterion; it is merely a practical consideration.

Figure 5:
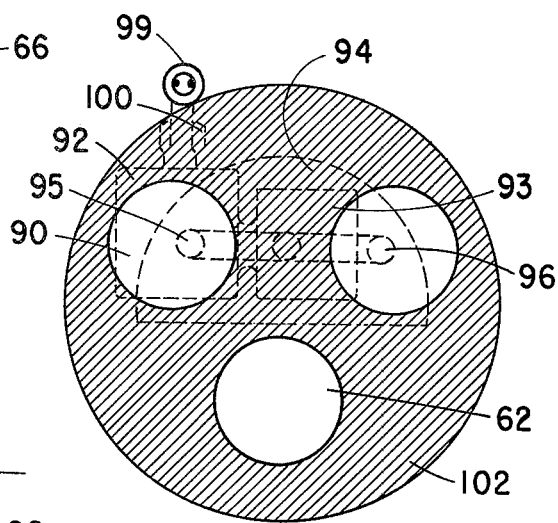
FIG. 5 shows a cross section across the equipment shown in FIG. 4, along the plane 5—5.
Figure 4:
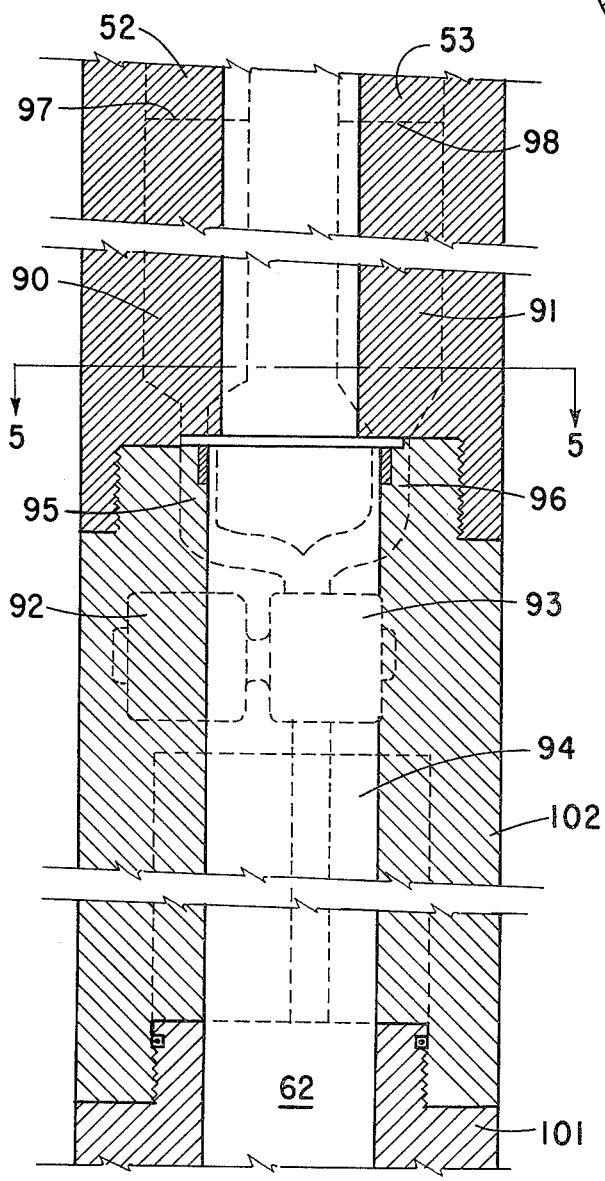
FIG. 4 shows a diagrammatic cross section of a modification of the equipment shown in FIG. 2.

A modification of the oscillator shown diagrammatically in FIG. 2 is illustrated in FIG. 4, and a cross section along the plane 5—5 is shown in FIG. 5. In this version of the tool, the chief modification is that instead of using free pistons 63 and 64, which are raised by applying pump pressure and lowered when the pressure is cut off, the variable elevation of the lower end of the cavities 52 and 53 is furnished by pumping mercury into the cavities to form variable volumes 90 and 91. The oscillator shown in FIG. 4 can be that shown in FIG. 2, down to plane 3—3. Below this, the modification consists in incorporating in the lower end of the oscillator an electric motor 92 coupled to a mercury pump 93, which takes suction from a mercury reservoir 94 located below the lower end of the variable volume portions of the cavities. No check valves 67 or 68 are used. The pump 93 discharges mercury, when actuated, through essentially identical conduits or passageways 95 and 96, into the lowermost end of the cavities 52 and 53, producing mercury interfaces with the liquid, as shown by numbers 97 and 98.

Particularly as shown in FIG. 5, the electric cable 99 used to actuate the pump motor 92 passes outside the oscillator through a packing gland 100 and thence up alongside of the pipe 28 to the surface. The mercury tank or sump 94, as shown particularly in FIG. 5, may be of semi-circular shape, fitting into the lower part of the oscillator, and being bottomed by a separate member 101, which screws into member 102, which in turn screws into lower body member 36. For simplicity in representation, the acoustic resistance 61 was not shown in the lower passageway 62, but it of course is employed as already discussed.

The advantage in using this particular arrangement instead of the free pistons is that the operator has a more instantaneous control of when the variable frequency oscillator pattern is produced. It is obvious that as soon as the pump motor 92 is shut down (or reversed, if desired), the mercury will tend to seep back into the lower reservoir 94, ready for the next cycle of operations. Motor 92 may be operated under constant speed conditions so that the location theoretically of the interfaces 97 and 98 is assured, i.e., so that the pattern of variable frequency is repeatable on each cycle of performance. It also may be used intermittently if a stepped frequency pattern is desired.

Figure 6:
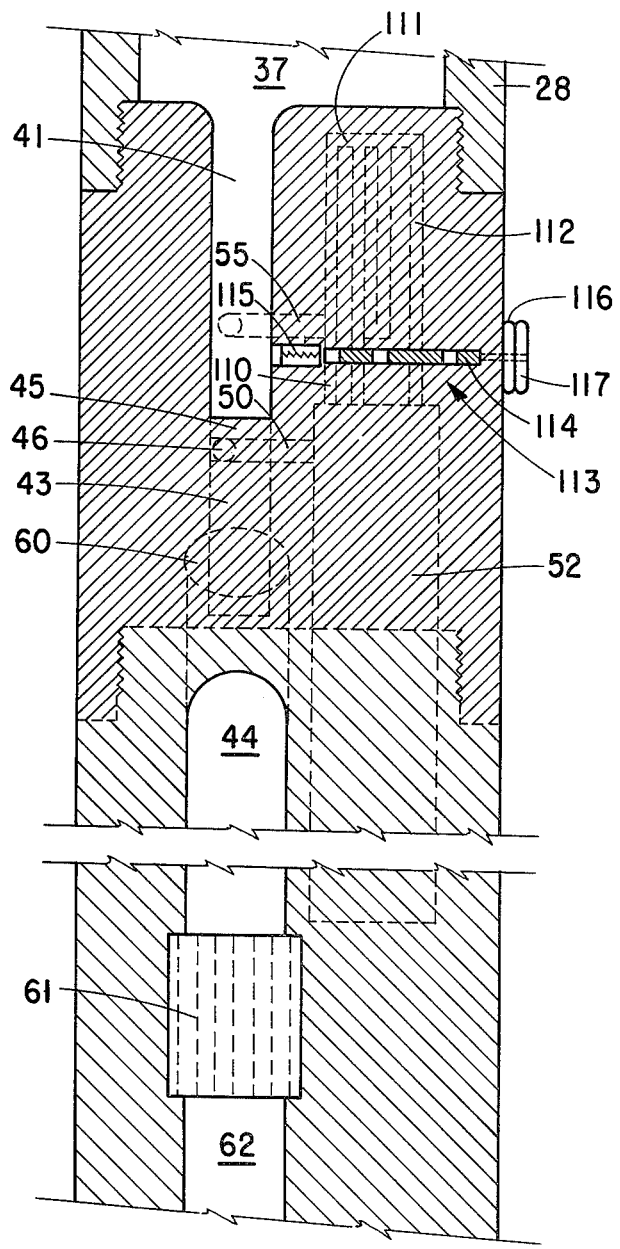
FIG. 6 shows a diagrammatic cross section of another variable frequency acoustic oscillator arranged for stepped frequency response.

Such an arrangement is seen in FIG. 6. This view is at right angles to those of FIGS. 2 and 4. In this version of the tool, the lower end of cavity 52 (and 53, not shown) is blanked off. Passage 46 is connected through conduit 50 to cavity 52, as before, but the passageways connecting cavity 52 to the jet passageway 56 have been altered. Conduit 55 is joined to vertical conduits 110 and 111. In turn, conduit 111 is connected to passageway 112. All three conduits 110, 111, and 112 are connected through a multiple valve 113 to cavity 52.

Valve 113 has plate 114 with 3 holes as shown so that it moves to the left, in turn, passage 55 is connected to cavity 52 through conduits 110, 111, and 112. The same arrangement is employed on the other half of the oscillator not shown in FIG. 6. Accordingly, this system provides for the fluid actuated oscillator 29 oscillating at 3 different frequencies (from high to low as valve plate 114 moves to the left, and vice versa).

One simple means for moving the valve plate 114 consists in spring-biasing the plate 114 to the right by spring 115. A valve rod 116 connects the plate 114 to the outer part of a siphon bellows 117. The space in valve 113 not occupied by plate 114 is vented (by means not shown) to conduit 41.

When pressure is applied (by passage of fluid through opening 37) to the oscillator 29, the bellows 117 gradually moves the valve plate 114 to the left in FIG. 6, causing a stepwise change in oscillator frequency. This will be in a constant pattern if the pump pressure is applied in a constant pattern each time.

Other arrangements can be employed to vary the oscillator frequency stepwise; that shown is one of the simpler ways. Any arrangement which stepwise alters an acoustic reactance in the oscillating circuit is appropriate for this purpose. There are several ways of prospecting using a stepwise change in oscillator frequency, rather than smooth changes in frequency. Any of these may be employed with this system of vertical prospecting. See, for example, U.S. Pat. Nos. 3,182,743 McCollum, 3,437,999 Landrum, 3,472,334 Snodgrass, and 3,568,142 Landrum-Shanks.

It is apparent from the description which has been made that there has been disclosed and taught a variable-frequency acoustic oscillator of high power capability, which can be inserted into a well to permit "vertical prospecting" using a variable-frequency source. The oscillator described further has a capability of repetitively pulsating at the same frequency-time pattern time and time again. This permits the operator to sum the geophone responses of a plurality of oscillator cycles of performance.

It will be apparent to those skilled in this art that the oscillator shown and described is built on sound acoustic principles, and that various mechanical modifications can be rather widely indulged in without departing from the spirit of the invention, as set forth in the appended claims.

We claim:

1. A seismic source suitable for subsurface use consisting of a fluid-actuated oscillator including a frequency determining fluid circuit comprising an acoustic reactance, means for supplying said oscillator with a liquid under pressure, and means within the body of said oscillator for changing said acoustic resistance while said oscillator is oscillating, whereby liquid discharged from said oscillator pulsates in pressure at predetermined changing time intervals from peak to peak.

2. A seismic source as specified in claim 1 in which said fluidic oscillator is of the bistable or two-channel type, each channel contains within the body of said oscillator a takeoff conduit and a jet conduit with the latter being closer to the oscillator throat than the former, each takeoff conduit is connected to a jet conduit by at least one acoustical inertance, an acoustical compliance is connected to said at least one acoustical inertance, and said changing means operates directly on at least one of said inertance and said compliance.

3. A seismic source as specified in claim 2 in which said changing means changes the volume of a compliance while liquid under pressure is flowing through said oscillator.

4. A seismic source as specified in claim 2 in which each takeoff conduit is connected to the jet conduit of the same channel by said inertance, said oscillator also includes two acoustical compliances, each separately connected to one only of said inertances, and said changing means changes at the same time the volume of each of said compliances.

5. A seismic source as specified in claim 4 in which said changing means is remotely actuated and operates to change the volume of each of said compliances by changing the liquid level between said liquid under pressure and a second liquid of much greater density.

6. A seismic source as specified in claim 4 in which said changing means is remotely actuated and operates to change the volume of each of said compliances by changing the position of two pistons each forming one boundary of one of said compliances.

7. A seismic source as specified in claim 2 in which said changing means is remotely actuated and operates to change the length of each of said inertances.

8. A seismic source as specified in claim 2 in which said changing means is remotely actuated and operates to change the acoustical reactance between said takeoff and said jet conduits discontinuously in a predetermined pattern among a plurality of predetermined values.

* * * * *